Figure 1:
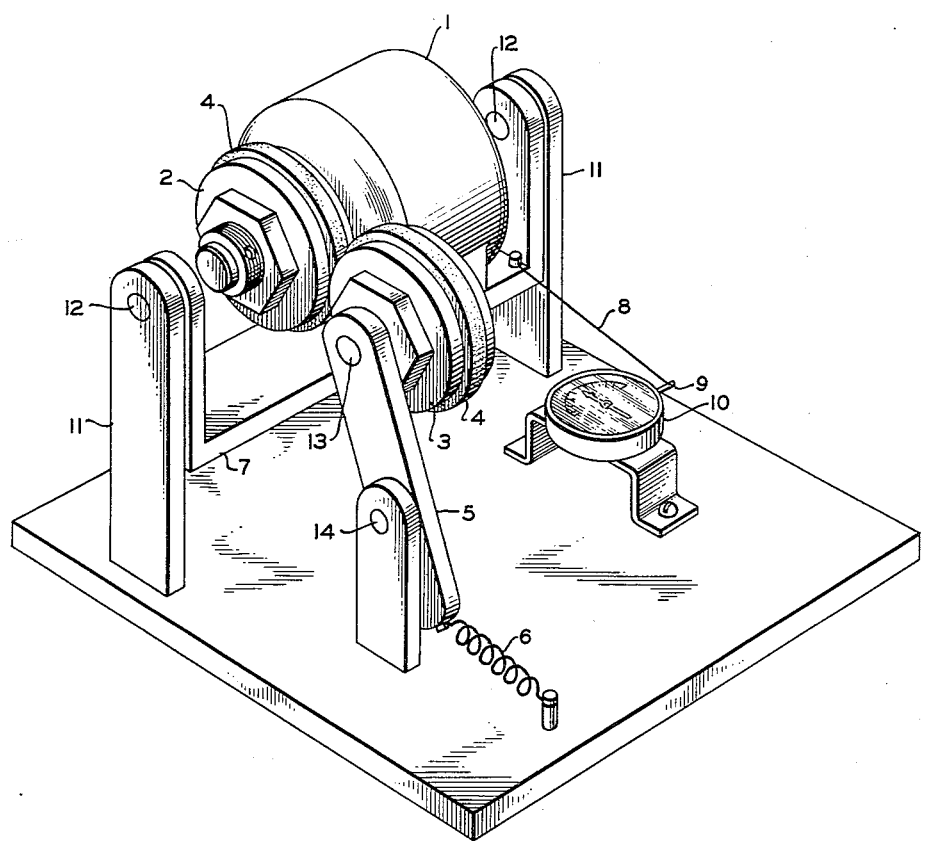

Sept. 11, 1956 S. S. PRENTISS 2,762,219
TACKMETER FOR DETERMINING TACK
OF RUBBER AND LIKE MATERIALS
Filed Jan. 2, 1952 2 Sheets-Sheet 1

INVENTOR.
SPENCER S. PRENTISS
BY
Hudson + Young
ATTORNEYS

Sept. 11, 1956  S. S. PRENTISS  2,762,219
TACKMETER FOR DETERMINING TACK
OF RUBBER AND LIKE MATERIALS
Filed Jan. 2, 1952  2 Sheets-Sheet 2

*INVENTOR.*
SPENCER S. PRENTISS
BY
*Hudson & Young*
*ATTORNEYS*

United States Patent Office 2,762,219
Patented Sept. 11, 1956

2,762,219

TACKMETER FOR DETERMINING TACK OF RUBBER AND LIKE MATERIALS

Spencer S. Prentiss, Bartlesville, Okla., assignor to Phillips Petroleum Company, a corporation of Delaware Application January 2, 1952, Serial No. 264,434

7 Claims. (Cl. 73—150)

This invention relates to an improved tackmeter for determining tack. A tackmeter is an instrument employed to determine the so-called "tack" or "tackiness" of rubber or rubber-like materials or substances.

In one of its aspects the invention relates to a combination of specific elements constituting an improved tackmeter or device for measurement of tack.

Tack is usually considered to be an indication of the cohesiveness of the sample being tested. For example, it has been common practice to press together two portions of the sample of material and to then pull the said pieces or portions apart by hand.

The magnitude of the force required to separate the two portions of the material is determined by the force applied to press their surfaces together, the duration of application of this force and the surface area in contact and in a hand test it is difficult to control these and possibly other factors within close limits. Such a test can be recorded only in general terms such as "fair" or "good" and will depend largely on the experience of the individual operator. It is very desirable to have available means for measuring the tack of rubber samples in which the variables affecting the tack measurement are controlled, and the personal element eliminated, and in which the tack can be read on a numerical scale.

There has been constructed in the art a tackmeter which, in effect, is a mechanized version of the above-described hand test. Means are provided for bringing the specimens into contact at a predetermined loading or thrust and for separating them, both the loading and the separating forces being recorded by scale pointers. There results in the use of such apparatus a variation in individual readings so that it is necessary to take a number of readings in order to obtain their average in order to obtain a truly representative value of tack.

According to the invention there is provided an improved tackmeter for determining tack, of a sample of rubber or like material, with which a single rapid determination of a value, which is an average value, can be made, the said tackmeter comprising a plurality of rotating members, elements or wheels, each adapted to receive and to retain peripherally thereon a specimen of the material to be tested and further adapted to be pressed against each other and still further adapted to be rotated or rotatable at several angular velocities, in a preferred form, one element being driven at a constant velocity while the other element is freely rotatable by energy transmitted to it from said driven element through the peripherally mounted and retained specimens on each of said elements and means for measuring the transmitted energy, for example the torque of said driven element. The manner of operating the tackmeter comprises the steps of pressing together a plurality of rotating elements onto each of which there has been mounted peripherally, as described, independent portions of the said specimen, causing one of said elements to be driven while the other is freely rotatable, adjusting the angular velocity of the driven element to be great enough so that little or no torque of the driven element is indicated, and then gradually reducing said velocity until there is observed a sudden or a sharp increase in the said torque. An alternative manner of operating the tackmeter comprises merely measuring the torque of the driven element at any desirable predetermined angular velocity thereof.

It is especially noteworthy as basic to the concept of the above-mentioned modes of operation for determining tack that an infinite number or a series of a very large number of determinations are being made all the while the apparatus is being operated and that therefore there is obtained very rapidly an accurate average determination of tack, in effect, of an infinite number of portions of the specimen being tested.

In the operation of the invention in which the driven element or wheel is rotated at a relatively high angular velocity and then slowed gradually until there is observed a sudden or sharp increase in the torque, as stated, basic to the concept involved, is the finding that a specimen having good tack ultimately, will not ordinarily exhibit this property if the contact time has been short or insufficient.

Figure 2:
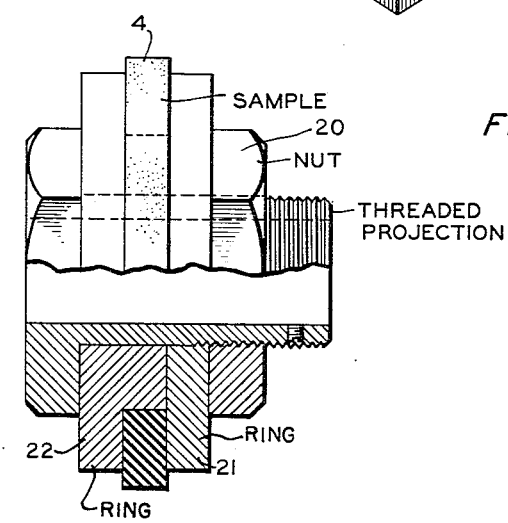
Figure 3:
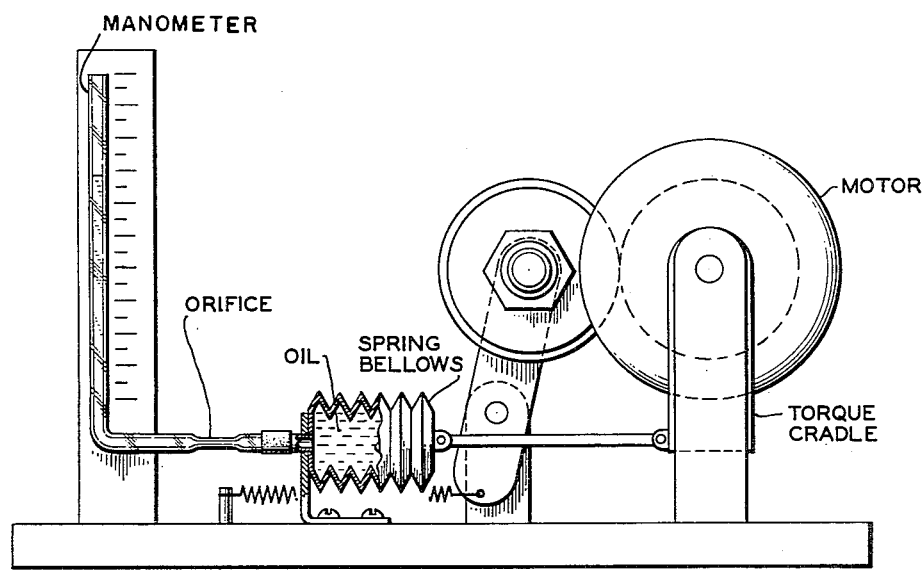
Figure 4:
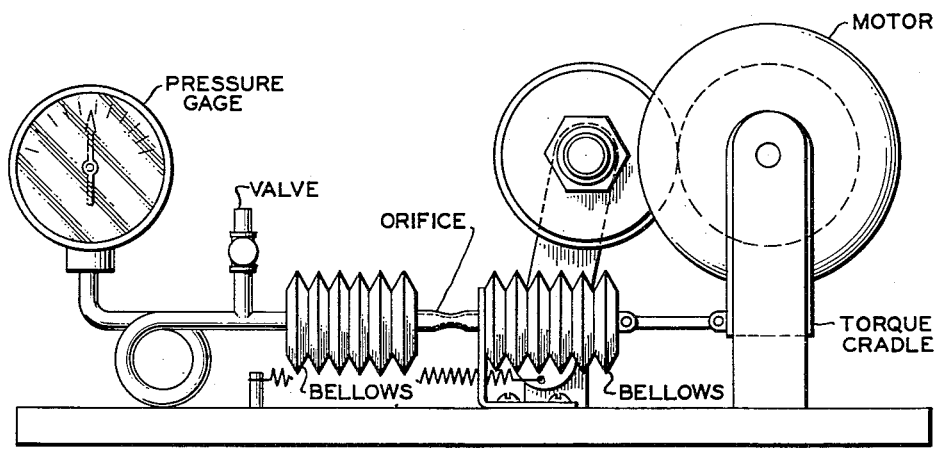

In the drawings, Figure 1 shows a perspective view of one form of an apparatus according to the invention. Figure 2 shows, partly in cross-section, an arrangement for clamping a sample onto the rotating elements of Figure 1. Figure 3 shows, partly in cross-section, a side elevation of another embodiment of the invention in which, in lieu of the gauge of Figure 1, there is used a spring bellows in combination with a manometer. Figure 4 is a side elevational view of a modification, of Figure 3, in which two bellows with a damping orifice therebetween is employed to provide sufficient damping in view of the small volume displacement of the pressure gauge. According to the modes of operation of the invention the apparatus of the drawings can be operated to obtain, as noted, an accurate average measurement of tack.

Referring now to Figure 1, strips of rubber stock or other material of constant and known thickness, for which it is desired to obtain a measure of tack, are fastened to the periphery of two wheels 2 and 3, which are mounted on free running bearings and placed in peripheral contact under a constant contact pressure, as by a suitable weight or spring 6. One wheel 3 is allowed to run free and the other 2 is driven at a constant speed. The tack of the material under test will then be given as a function of the torque of the driven wheel, which may be measured by conventionl methods. In the drawing an electric motor 1 provides the power and is mounted on yoke 7, swinging on bearings 12. The torque is absorbed by spring gauge 10 which is attached to yoke 7 by a wire 8.

In the drawing in Figure 2 is shown an arrangement for clamping peripherally upon a rotating member a standard size sample of the material, the tack of which is to be determined. A suitable portion of sample cut from a sheet of sample of suitable thickness, as a ring 4, is placed upon the apparatus of Figure 2 by first removing the nut 20 and the sample clamping ring 21, slipping the sample over the smaller diameter portion of the left-hand sample clamping ring 22, as shown, replacing the right-hand sample clamping ring, and tightening the nut. A satisfactory method for obtaining a fresh, smooth contacting surface of precise radius and width has been to cut the sample slightly larger than the diameter of the wheel, mount it in position between the clamping rings but with the nut not completely tight, then, using a sharp knife to trim the sample flush with the periphery of the clamping rings and tighten the nut completely, thus causing the edge of the sample to protrude sufficiently to make contact with opposite sample.

Figures 3 and 4 show additional apparatus for measuring of the torque and again the legend is believed to be sufficiently descriptive of these figures. However, referring now to Figure 3, the torque cradle either compresses or extends the spring bellows, thereby transferring fluid to or from the sight glass or manometer. An orifice is provided for damping of sudden variations of oil pressure due to sudden variations of torque.

In the apparatus according to Figure 4, two spring bellows are provided, as shown, with the damping orifice placed therebetween. In place of the sight glass, a pressure gage is provided. Also shown in Figure 4 is a zeroing valve for initially adjusting the apparatus.

Tests were made on the samples described in Table I.

Table I

| Designation | #1 S. S. | 1 | 2 | 3 | 4 |
|---|---|---|---|---|---|
| X-558 | | 100 | 100 | 100 | 100 |
| #1 S. S. | 100 | | | | |
| Philblack O | | 25 | 25 | | |
| Zinc Oxide | | 5 | 3 | | |
| Stearite | | 1 | 1 | | |
| Paraflux 2016 | | | 5 | | |
| Staybelite Resin | | | 2.5 | | |
| Sulfur | 2.75 | 2.5 | | | |
| Santocure | 0.7 | 1.0 | | | |
| A-32 | | 0.2 | | | |
| Pine Tar | 4 | | | | |
| Koresin | | | 0.25 | 0.5 | 1.0 |

The samples were mounted so as to display a surface one-eighth of an inch wide in contact. The same pressure was exerted in all measurements and amounted to approximately four ounces. The contact wheels were driven at 8 R. P. M. No units can be assigned to the torque reading, and tack has therefore been calculated relative to sample 1 (X-558) as 1.00.

Table II

| Sample | Torque Range | Average | Tack |
|---|---|---|---|
| 1 | 12-14 | 13 | 1.00 |
| 2 | 16-20 | 18 | 1.38 |
| 3 | 20-28 | 24 | 1.85 |
| 4 | 30-40 | 35 | 2.70 |
| #1 S. S. | 60-100+ | | |

The tack measurements of samples 1, 2, 3 and 4 plotted against parts of "Koresin" make a smooth curve of the form $tack = 1 + KX$, where K is a constant and X is the parts of "Koresin" per 100 parts of X-558. The readings on the X-558 samples remained without change for periods of ten minutes or longer. The "jumps" were disregarded and the more or less smooth part of the reading is reported as "torque range." The torque readings for the number one smoked sheet were considerably higher than those for the X-558 samples. After a short period of running, the tack was so great that the cleavage plane was not always the same as the plane of contact, indicating that the tack of the sample was equal to the tear strength of the material. In some cases the measured tack (or "tear") of the natural rubber samples was beyond the range of the indicator on the experimental machine used in making the tests. This is the significance of the figure 100+, the highest dial reading being 100.

The material designated X-558 in Table I is a synthetic rubbery copolymer prepared by polymerizing at 41° F. in aqueous emulsion, 71 parts by weight of butadiene and 29 parts by weight of styrene having a Mooney value of approximately 55 (ML-4). 1 S. S. designates a first grade smoked sheet of natural rubber. The remainder of the components are well known compounding ingredients.

Philblack O—a high abrasion furnace black
Stearite—stearic acid
Paraflux — saturated polymerized hydrocarbon (an asphaltic flux)
Staybelite resin—a hydrogenated rosin: brittle solid with pale amber color and slight odor; specific gravity 1.045; melting point 76° C.; acid number 162; saponification number 167
Santocure — N - cyclohexyl-2-benzothiazolesulfenamide
A-32—Reaction product of butyraldehyde and butylidene aniline
Koresin—(a tackifier)—a condensation product of tert-butylphenol and acetylene.

When operating the apparatus of the invention in which an initially higher angular velocity is employed, the tack of the sample is given as a function of the angular velocity at which increase in torque is first observed.

For best results the tackmeter of the present invention should be operated under controlled conditions of temperature and humidity.

Variation and modification are possible within the scope of the foregoing disclosure and the appended claims to the invention the essence of which is that an improved tackmeter essentially comprising in combination a driven element or wheel and a freely rotatable element or wheel, each being adapted to retain peripherally a portion of a sample of material whose tack is to be measured or determined and further adapted to be pressed together with said peripherally retained portions in contact, means to drive said driven element or wheel, means to cause said driven element or wheel to be pressed against said freely rotatable element or wheel, and means to determine the torque of the driven element or wheel at any one of various angular velocities.

I claim:

1. A tackmeter comprising, in combination: an electrical motor suspended so as to be freely and angularly displaceable about the axis of a rotor thereof, a driven wheel fixedly attached to said rotor, a freely rotatable wheel, each of said wheels being adapted to hold a tire-shaped sample of material the tack of which is to be measured, said freely rotatable wheel being translationally movable to bring said samples into peripheral contact with each other and means for measuring the force of angular displacement of said motor.

2. A tackmeter comprising, in combination: a yoke which is pivotally mounted so that it can swing to and fro with a swinging motion; a variable-speed driving mechanism fixed to said yoke to drive a rotatable element connected to a rotor of said mechanism; a freely rotatable element; said rotatable elements comprising, in combination, a hollow bolt having a bolt head and a threaded portion, a washer positioned on said bolt to bear against said bolt head, said washer having a large-diameter portion and a small-diameter portion, thus being adapted to receive a tire-shaped sample which fits around said small-diameter portion and bears against said large-diameter portion, another washer positioned on said bolt to bear against said sample and said small-diameter portion of the first-mentioned washer, and a nut engaging the threads of said threaded portion of said bolt to press said washers and said sample against each other and toward said bolt head; said first-mentioned rotatable element and the said freely rotatable element receiving and retaining, peripherally, independent portions of a solid material to be tested for tack; means for pressing together, at their peripheries, the said first-mentioned rotatable element and said freely rotatable element; and means, comprising a spring bellows and a device, responsive to pressure created in said spring bellows, operatively connected to said yoke for measuring the force of displacement of said yoke when the tackmeter is in operation.

3. A tackmeter comprising, in combination: a variable-speed electric motor mounted in a yoke and suspended so as to be freely and angularly displaceable about the axis of a rotor of said motor; a driven wheel fixedly attached to said rotor; a freely rotatable wheel; each of said wheels being adapted to hold a tire-shaped sample of material the tack of which is to be measured; said freely rotatable wheel being mounted on a lever which is pivotally moveable to bring said samples into peripheral contact with each other; means for biasing said lever to maintain said peripheral contact; and means, operatively connected to said yoke, for measuring the force of angular displacement of said motor.

4. A tackmeter according to claim 3 wherein said means for measuring the force of angular displacement comprises a fluid-filled spring bellows operatively connected to said yoke, a manometer connected to the interior of said spring bellows and a damping orifice connected between said bellows and said manometer.

5. A tackmeter according to claim 4 wherein said spring bellows comprises a plurality of sections and a damping orifice intermediate said sections.

6. A tackmeter comprising, in combination: a base; a pair of upright standards attached to said base; a yoke swingably mounted between said standards; and electric motor mounted on said yoke; said yoke being swingable about the axis of a rotor element of said motor; a driven wheel fixedly attached to said rotor element; a freely rotatable wheel; each of said wheels being adapted to hold a tire-shaped sample of material the tack of which is to be measured; said freely rotatable wheel being attached to a lever which is pivotally mounted on an upright standard attached to said base, in such a manner as to be moveable to bring said samples into peripheral contact with each other; biasing means attached to said lever and adapted to maintain said peripheral contact; and means, mounted on said base, for measuring the force of angular displacement of said motor.

7. A tackmeter, comprising in combination: a motor suspended so as to be rotationally displaceable about the axis of a rotor thereof, a driven rotatable element attached to said rotor and rotatable therewith, a freely rotatable element, each of said elements being adapted to hold a cylindrical-surfaced sample of material, the tack of which is to be measured, said freely rotatable element being translationally moveable to bring the samples into peripheral contact with each other, and means for measuring the force of rotational displacement of said motor.

References Cited in the file of this patent

UNITED STATES PATENTS

| | | |
|---|---|---|
| 1,476,775 | Sproull | Dec. 11, 1923 |
| 1,920,263 | Langbein | Aug. 1, 1933 |
| 1,932,287 | Donovan | Oct. 24, 1933 |
| 2,101,322 | Reed | Dec. 7, 1937 |
| 2,172,095 | White | Sept. 5, 1939 |
| 2,317,701 | Ullman | Apr. 27, 1943 |
| 2,385,382 | Samiran | Sept. 25, 1945 |
| 2,390,510 | Chatten | Dec. 11, 1945 |
| 2,406,989 | Bonner et al. | Sept. 3, 1946 |
| 2,473,517 | Freedman | June 21, 1949 |